Dec. 26, 1922.
1,440,061
J. M. CONNOLLY.
AUTOMOBILE LICENSE CARD HOLDER.
FILED APR. 17, 1922.
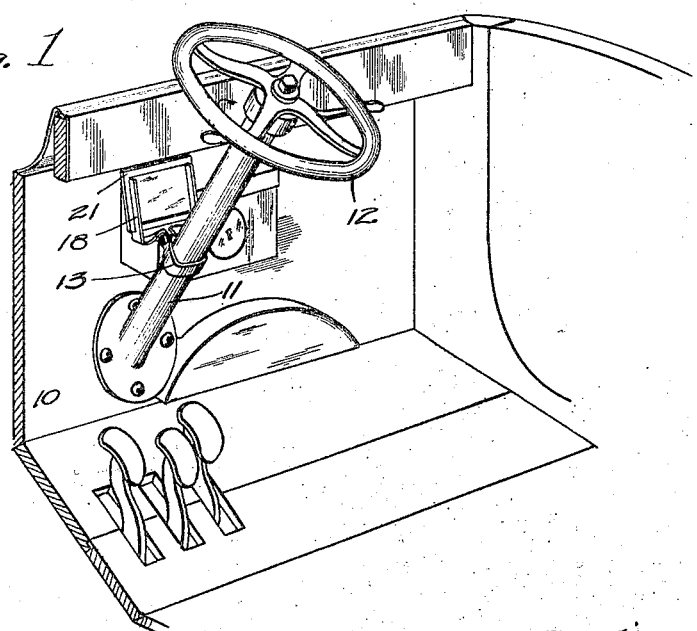
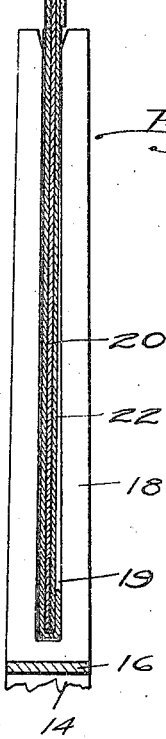
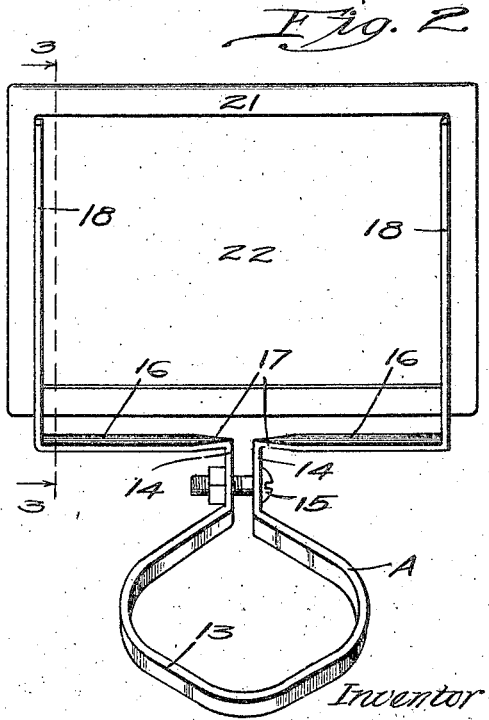
Witness
Lynn Latta
Inventor
John M. Connolly.
By Bair & Freeman Attys Patented Dec. 26, 1922.

1,440,061

UNITED STATES PATENT OFFICE.

JOHN M. CONNOLLY, OF DES MOINES, IOWA.

AUTOMOBILE LICENSE-CARD HOLDER.

Application filed April 17, 1922. Serial No. 554,076.

*To all whom it may concern:*

Be it known that I, JOHN M. CONNOLLY, a citizen of the United States, and a resident of Des Moines, in the county of Polk and State of Iowa, have invented a certain new and useful Automobile License-Card Holder, of which the following is a specification.

The object of my invention is to provide an automobile license card holder adapted to be secured to a steering post of an automobile or the like and to frictionally hold the license card in proper position, the holder being formed of a single piece of material and comparatively cheap in construction.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a perspective view of a portion of an automobile with my improved license card holder shown thereon.

Figure 2 is a front elevation of the holder device with the license card container shown therein; and Figure 3 is a sectional view taken on the line 3—3 of Figure 2.

In the accompanying drawings, I have used the reference numeral 10 to indicate generally the ordinary parts of an automobile body, which is provided with a steering post 11 having a steering wheel 12 thereon.

My improved license card holder comprises a single strip of material A bent midway between its ends, so as to form an open loop 13. Extending outwardly from the ends of the open loop 13 are the portions 14. The portions 14 are provided with a pair of registering openings (not shown) through which is extended the bolt 15.

The loop 13 is designed to receive the steering post 10 and to be frictionally held in position by tightening the bolt 15.

Extending laterally from each of the free ends of the portions 14 are the projections 16. The projections 16 extend away from the portions 14 substantially at right angles thereto.

It will be understood that the steering post 11 is normally inclined slightly and in order to have the license card remain in a substantially vertical position, it is necessary to twist the projections 16 a slight amount as at 17.

Each of the ends of the projections 16 are provided with upwardly extended arms 18. The upwardly extending arms 18 are bifurcated, so as to form the notches 19 therein.

The upper ends of the arms 18 are bent slightly together for contracting the width of the notches formed by the bifurcated arms.

The license card 20, which is a thin sheet of paper, is ordinarily mounted in a sheet metal container 21, having an isinglass covering 22.

The entire container and license card are designed to be slipped into the notches 19 and to be frictionally held therein.

The arrangement whereby the upper ends of the arms 18 are bent slightly together permits the container, having the license card therein to be frictionally held in position.

In this connection, it may be mentioned that in a great many States, license cards are required to be fixed on the dash or steering post of the automobile in easy display.

The license card contains the name of the owner of the car and address and other information, so that the owner may be located, whenever it is necessary.

My device is so arranged that the license card may be displayed in a very convenient manner without the necessity of fastening it to some part of the car, where it would be impossible to see it or where nails or screws would have to be extended into the automobile.

It will be seen that my device is very simple and is made up of a single piece of material and is so arranged that the open loop 13 may be extended around steering posts of various sizes and shapes.

Some changes may be made in the arrangement and construction of the various parts of my device, without departing from the essential features and purposes of my invention, and it is my intention to cover by my claims, any modified forms of structure or use of mechanical equivalents, which may be reasonably included within their scope.

I claim as my invention:

1. A card holder for automobile licenses or the like adapted to be secured on the steering post of an automobile, including a single strip of material bent midway between its ends for forming an open loop for receiving the steering post, outwardly extending portions on the ends of the open loop, a bolt extended through registering openings formed in said last portions, said last portions each having a lateral projection formed from the strip of material, upwardly extending arms formed on the ends of said lateral projections, said arms being bifurcated so as to provide elongated notches adapted to receive a card for maintaining it in position, the upper ends of said bifurcated arms being bent slightly together for contracting the width of the notches therein so as to frictionally engage the card.

2. A card holder for automobile licenses or the like adapted to be secured on the steering post of an automobile, including a single strip of material bent midway between its ends for forming an open loop for receiving the steering post, outwardly extending portions on the ends of the open loop, a bolt extended through registering openings formed in said last portions, said last portions each having a lateral projection formed from the strip of material, upwardly extending arms formed on the ends of said lateral projections, said arms being bifurcated so as to provide elongated notches adapted to receive a card for maintaining it in position.

Des Moines, Iowa, April 12, 1922.

JOHN M. CONNOLLY.